Oct. 17, 1950 R. A. RODRICK 2,526,611
SIGNAL DEVICE FOR VEHICLES
Filed Aug. 29, 1947 3 Sheets-Sheet 1
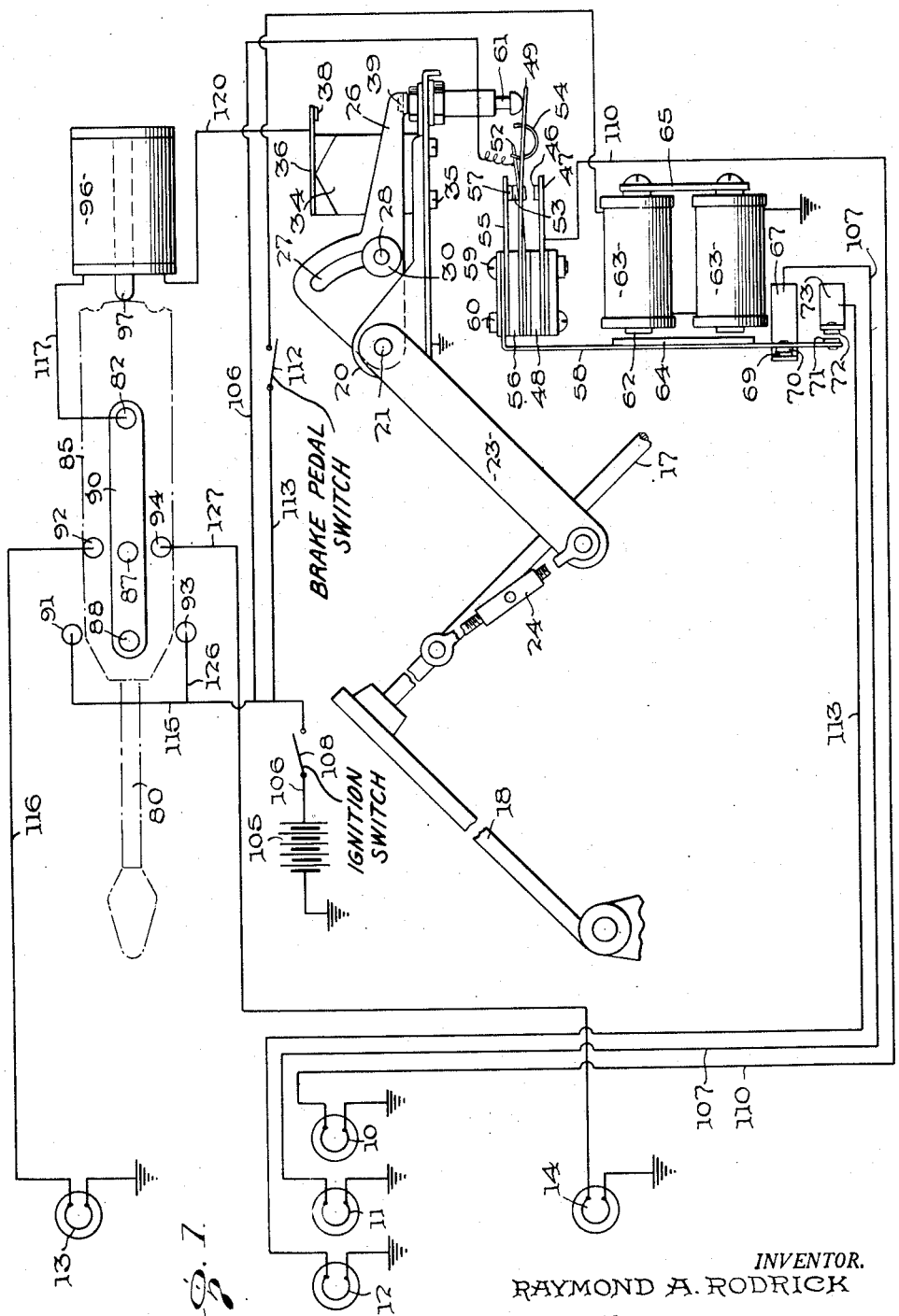
INVENTOR.
RAYMOND A. RODRICK
BY
*Walter F. Estabrook*
his ATTORNEY Oct. 17, 1950  R. A. RODRICK  2,526,611
SIGNAL DEVICE FOR VEHICLES
Filed Aug. 29, 1947  3 Sheets-Sheet 2
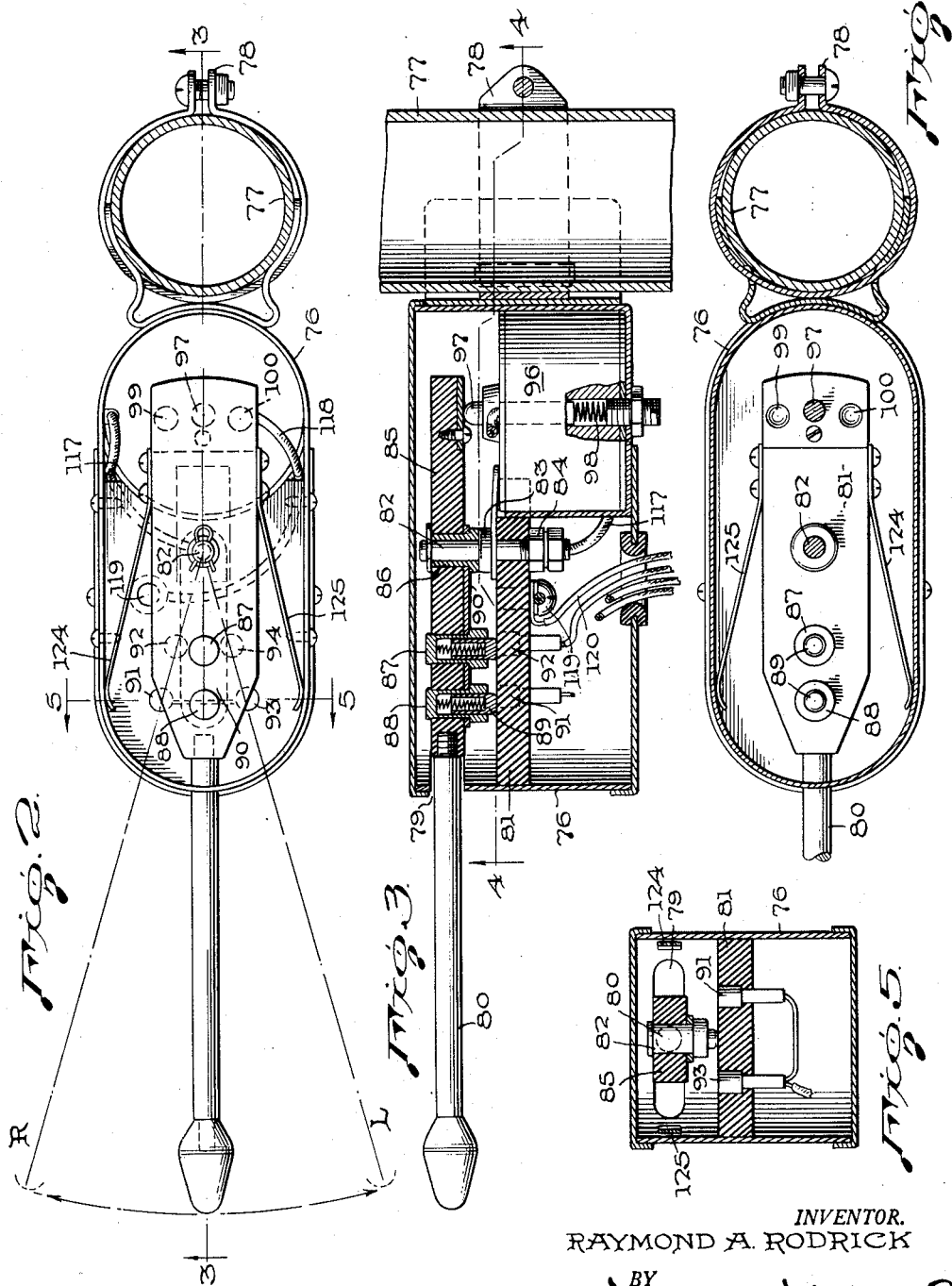
INVENTOR.
RAYMOND A. RODRICK
BY
Walter T. Estabrook
his ATTORNEY Oct. 17, 1950     R. A. RODRICK     2,526,611
SIGNAL DEVICE FOR VEHICLES
Filed Aug. 29, 1947     3 Sheets-Sheet 3
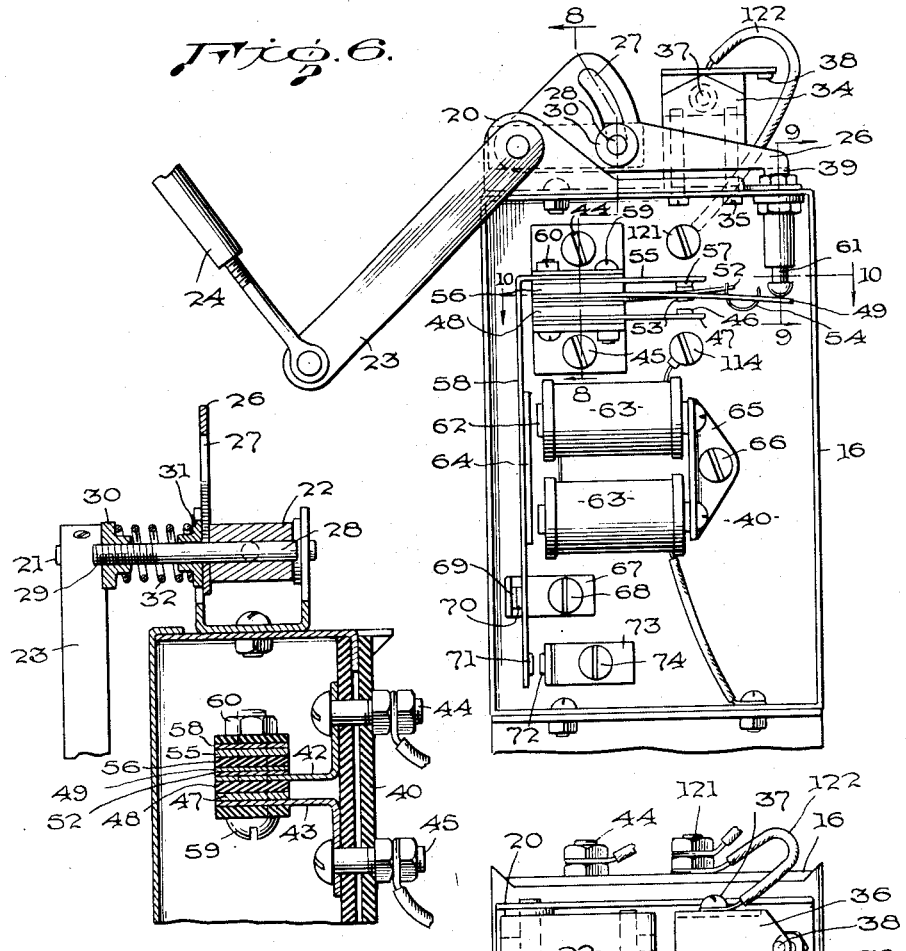
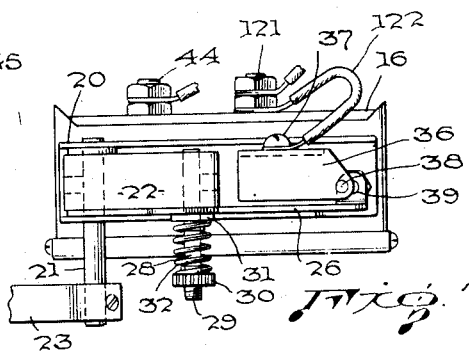
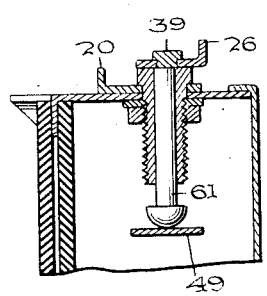
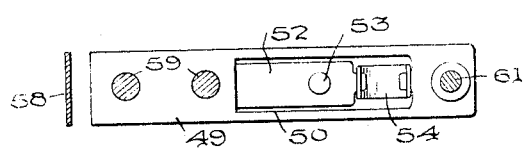
INVENTOR.
RAYMOND A. RODRICK
BY Walter T. Colebrook
his ATTORNEY Patented Oct. 17, 1950

2,526,611

UNITED STATES PATENT OFFICE 2,526,611

SIGNAL DEVICE FOR VEHICLES

Raymond A. Rodrick, Akron, Ohio; Jessie G. Rodrick, executrix of said Raymond A. Rodrick, deceased, assignor to Jessie G. Rodrick, Vermilion, Ohio Application August 29, 1947, Serial No. 771,267

2 Claims. (Cl. 177—337)

1

This invention relates to a signal device and more particularly to an improvement in signal devices for automobiles of the type disclosed in my United States Patents No. 2,301,583 and 2,301,584 of November 10, 1942.

An object of this invention is to provide a signal device which will include signal light units at the rear of the vehicle to indicate the intention of the driver with respect to the progress of the vehicle, and whether the vehicle will make a turn to the left or the right.

A further object of the invention is to provide a switch box for the signal lights that may be conveniently mounted on the vehicle and operated in conjunction with the foot pedal which is ordinarily used to open and close the throttle.

Another object of the invention is to provide means for controlling the directional signals by the movement of the foot pedal.

This invention consists in a series of lights arranged in a suitable housing wherein one lamp is provided with a green lens to indicate a vehicle in motion, another lamp having a yellow lens to indicate caution, and a third lamp having a red lens indicating danger or stop. In addition, two lamps are provided with suitable lenses for indicating right and left hand turns. The red lamp indicating stop is under the control of the operator, while the other lamps are operated as the operator operates the accelerator pedal and in a manner whereby only one lamp of the unit, consisting of the green, yellow and red, will be lighted or illuminated at a given time.

In the accompanying drawings,

Figure 1 is a schematic diagram for a signal light system made in accordance with this invention.

Figure 2 is a top plan view with the cover removed of the manual control for establishing the lights in either the right or left hand turn signals.

Figure 3 is a longitudinal vertical sectional view on line 3—3 of Figure 2 of the manual control box with certain parts broken away.

Figure 4 is a horizontal sectional view on the line 4—4 of Figure 3.

Figure 5 is a transverse vertical sectional view along the line 5—5 of Figure 2.

Figure 6 is a view in elevation of the switch box with the cover removed.

Figure 7 is a detail view taken from the top of the switch box showing the parts in top plan.

Figure 8 is a sectional view taken on line 8—8 of Figure 6.

2

Figure 9 is a view in section taken on line 9—9 of Figure 6.

Figure 10 is a detail sectional view taken on line 10—10 of Figure 6.

In the form of the invention as set forth in the drawings, reference is made to Figure 1 wherein a series of lights is provided which may be housed as a unit and this unit mounted in the rear or incorporated in the rear portion of the vehicle. This unit comprises three lights, a green lamp 10, a yellow lamp 11 and a red lamp 12. The top light 10 is a green light preferably provided with a green lens and indicates a throttle opening or accelerating condition of the vehicle; and the light 11 therebelow being yellow and preferably provided with a yellow lens to indicate caution or deceleration of the vehicle; and the bottom light 12 being a red light to indicate that the vehicle is coming to a stop or that the brakes have been applied.

Located at each side of the unit of the three lights just described are two lights 13 and 14 to indicate left and right hand turns, the light 13 preferably indicating the right hand turn light and the light 14 indicating the left hand turn light.

In Figures 6 to 10, is disclosed a switch box 16, which may be mounted on the engine block or any other suitable place on the vehicle, where it may be associated with the throttle rod 17 and its linkage from the accelerator pedal 18 to the carburetor.

A U-shaped bracket 20 is mounted on an end of the switch box 16 and a shaft 21 is journaled in the bracket. An arm 22 is keyed to the shaft 21 and is disposed within the channel of the bracket. A link 23 is keyed to the shaft 21, and an extensible link 24 is pivotally connected to link 23 and to throttle rod 17, so that upon the downward or acceleration movement of the foot pedal 18 the links 23—24 will rotate the shaft 21 and arm 22.

Loosely mounted on the shaft 21 and located within the bracket 20 alongside of the arm 22 is a lever arm 26. The lever arm 26 is provided with an arcuate slot 27 through which a stud 28 extends. The stud 28 is keyed to the arm 22 and is provided with screw threads 29 for the reception of a nut 30 and friction disk 31. The nut 30 and friction disk 31 are connected together by a coiled spring 32, so that sufficient pressure may be applied to the lever arm 26 to insure its travelling with the arm 22 as the latter is oscillated by the linkage 23—24.

Mounted in the channel bracket 20 beyond the arm 22 is an insulated block 34 which is secured to the switch box 16 and bracket 20 by screws 35. Secured to the top of the block 34 is a contact plate 36 by a binding post 37. The plate 36 is disposed above the lever arm 26 and is provided with a contact 38 adapted to be engaged by a contact 39 on the lever arm 26. This plate 36 also acts as a stop in limiting the swinging movement of the lever arm in one direction.

The rear wall 40 of the switch box 16 is preferably of insulated material and located within the box are two angular terminal members 42, 43 which are secured to the wall 40 by binding posts 44 and 45 respectively. Mounted on the terminal member 43 is a contact plate 47 which extends to one side of the member 43 and is provided with a contact 46. Insulation 48 is interposed between plate 47 and terminal member 42. Mounted on terminal member 42 is a flexible strip 49 which is provided with an elongated slot 50. Interposed between the terminal member 42 and strip 49 is a flexible contact member or strip 52 which is disposed parallel to strip 49, and is provided with a contact 53 which projects from both sides thereof.

Disposed between the end of the flexible member 52 and an end of slot 50 of strip 49 is a leaf spring 54. Mounted above strips 49 and 52 is a contact plate 55 and separated therefrom by insulation 56. The contact plate 55 is disposed in parallelism to contact plate 47 and strips 49, 52, and is provided with a contact 57. Contacts 57 and 46 are adapted to be engaged by contact 53 of contact strip 52. Mounted on contact plate 55 is a contact bar 58. Contact plates 47, 55, flexible strips 49, 52 and contact bar 58 are connected to terminal members 42, 43, by screws 59 and nuts 60.

When the vehicle is not in motion, the flexible strip 49 is held down, as indicated in Figure 6, and the flexible contact member 52 has been urged upwardly so that the contact 53 thereof is brought into engagement with contact 57 of contact plate 55. The strip 49 is held in its downward position by means of a sliding pin 61 which is mounted in an end of the switch box 16. The pin 61 is urged downwardly against the strip 49 by the end of the lever arm 26 which rests on an end of the pin. When the lever arm 26 is raised due to acceleration movement of the pedal 18, the strip 49 will cause the pin to move upwardly and the spring 54 will cause contact member 52 to be thrown toward contact plate 47 and contacts 46 and 53 brought into engagement.

The contact bar 58 is disposed over the cores 62, of electromagnets 63 and is provided with contact 64 for engagement with the cores 62. The electromagnets 63 are supported on the wall 40 of the switch box 16 by a bracket 65 which is attached to the wall 40 by a screw 66. A contact plate 67 mounted on wall 40 by a binding post 68 and is provided with a contact 69 which is normally in engagement with a contact 70 of contact bar 58. The bar 58 is provided at its lower end with a contact 71 which is located on the opposite side of the bar from contact 70, and is opposite to contact 72 of contact plate 73, supported on wall 40 by binding post 74.

A directional signal housing 76 is preferably supported on the steering column 77 by a bracket 78. A curved slot 79 is formed in an end of the housing 76 through which projects a lever or handle 80. A mounting member 81 is supported in the housing and has a shaft 82 secured thereto by a collar 83 and nut 84. The inner end 85 of the lever 80 is preferably of insulated material, and a collar or bearing 86 extends therethrough, through which the shaft 82 extends and on which the lever 80 may be oscillated. Two contact cups 87, 88 are mounted in the lever 80 in which are received spring operated plungers 89. The collar 86 and cups are connected together by a metal contact strip 90.

The mounting member 81 is provided with four contacts 91, 92 and 93, 94, so that when the lever 80 is swung for making a right hand directional turn the plungers 89 will engage contacts 91 and 92 for establishing a circuit to illuminate the light 13, and when the lever 80 is swung for indicating that a left hand directional turn is to be made the plungers 89 will engage contacts 93 and 94 for causing light 14 to be illuminated.

Mounted within the housing 76 is a solenoid 96 having a core 97 urged outwardly therefrom by a spring 98, against the rear end of lever 80. The lever is provided with two recesses 99 and 100, into one of which the core projects when the lever 80 is moved to indicate a right or left hand directional signal 13 or 14.

The wiring system for the various signals, comprises a battery 105 and a line 106 leading therefrom to the binding post 44 of the switch box 16, through contact member 52, contacts 53 and 57 to contact plate 55, and through contact bar 58 and contacts 69 and 70, contact plate 67 and through line 107 to yellow light 11. Upon the closing of ignition switch 108 the above circuit is completed and the yellow or caution light 11 is illuminated.

Assuming it is the desire to move the vehicle, the operator presses down on the accelerator pedal 18 causing the throttle member 17 and linkage 23, 24 to be operated thereby causing the lever arm 26 to be rotated and removed from engagement with pin 61. This allows the flexible strip 49 to move toward the contact plate 55 and slide the pin 61. The leaf spring 54 will be flexed causing flexible contact member 52 to move toward contact plate 47 and bring contacts 53 and 46 together. The establishing of the circuit through the foregoing breaks the circuit to the yellow lamp 11, and thereby extinguishing the same. The line 110 leads from binding post 45, associated with contact plate 47, to the green light 10, which indicates a throttle opening or accelerating condition of the vehicle.

Upon closing the switch 112 by the operation of the brake pedal, in line 113 leading from line 106, current will flow through line 113 to binding post 114 on switch box 16 to the electromagnets 63. The electromagnets are thereby energized and attract contact 64 of bar 58 to the cores 62 of the magnets. This action separates contacts 69 and 70 and causes the establishing of the circuits through contacts 71 and 72. Line 113 leads from contact plate 73 of contact 72 to the red light 12 causing it to be illuminated and indicating a danger or stop signal.

It will be observed that when the vehicle is stationary and the ignition switch 108 is closed that the circuit is completed through line 106 and 107 to the yellow or caution light. Immediately however, upon starting the vehicle and upon the operation of the accelerator pedal, the circuit through lines 106 and 107 is broken by the lever arm 26 releasing the pin 61 from engagement with the flexible member 49 and causing the spring 54 to cause the flexible contact member 52 to establish contact with contact 46 and through line 110 to the green light 10 to cause it to be illuminated. The green light 10 will continue to be illuminated as long as the car or vehicle is in motion or in an accelerated condition. However, upon the release of pressure on the accelerator pedal 18, the lever arm 26 will again contact the pin 61 and operate the member 49 causing the flexible contact member 52 to again contact the contact 57 of contact plate 55 and reestablish the circuit to the yellow or caution light 11. The yellow light will be immediately illuminated and the green light 10 extinguished. Should the brake pedal be operated and the switch 112 closed in the line 113 by the operator in removing his foot from the accelerator pedal 18, the circuit would be established through the electromagnet 63 to the red light 12 and cause it to be illuminated and simultaneously cause the yellow light to be extinguished because the contact bar 58 has been attracted by the magnets breaking contact between contacts 69 and 70 and establishing the circuit between contacts 71 and 72.

It will be observed that at all times upon the closing of the ignition switch, one of the lights 10, 11 and 12 will be illuminated so that an operator in a following car is acquainted with the intention and action of the operator of the car in the lead. Even though the operator might have his foot on the brake pedal and the switch 112 closed immediately upon application of power to the accelerator, the lever arm 26 would again be raised releasing the pressure on the member 49 and through the spring 54 causing contacts 53 and 46 to be brought into engagement. This breaks the circuit to the red lamp but establishes the circuit to the green light and thereby indicating that the operator is applying power to move the vehicle.

In addition to the foregoing the right and left turn directional signal lights 13 and 14 are controlled by the operation of the throttle mechanism. If a right turn is desired the lever or handle 80 would be thrown to a position for causing the contacts 87 and 88 thereof to engage contacts 92 and 91 of the line 115 which leads from line 106 and line 116 leading from contact 92 to the right hand light 13 causing it to be illuminated. The movement of the lever 80 causes the core 97 of the solenoid 96 to enter the recess 99 in the lever and hold the lever in its thrown position. The circuit to the solenoid is from the contact 91 and contact 88 and through the bar 90 of the lever to the shaft 82, thence through line 117 to solenoid 96 and from solenoid through line 118 to binding post 119 mounted in the mounting member 81. Line 120 leads from binding post 119 to binding post 121 on the switch box 16 and line 122 leads from the binding post 121 to binding post 37 of contact plate 36 and thence to contact 38 of the contact plate 36. When this circuit is established by the lever arm 26 bringing its contact 39 into engagement with the contact 38 of the contact plate 34, the solenoid 96 would be energized and retract the core 97 from the recess of the lever handle. The lever handle is provided with springs 124 and 125 on each side thereof which bear against the walls of the housing 76. One of these springs has been placed under tension on the movement of the lever for establishing the circuit to the right hand lamp 13 and upon the core 97 being retracted from the recess 99 of the handle the spring 124 will cause the handle to be restored to its neutral position. The same operation is applicable to the movement of the handle 80 to the position for establishing the circuit to the light 14 for making a left turn. In this instance the circuit is completed by line 126 leading from line 115 to contact 93 and by line 127 from contact 94 to lamp 14.

It will be observed that upon the movement of the lever arm 26, upon the downward movement of the foot pedal 18, it releases the pressure on the flexible member 49 by its disengagement with the pin 61. The member 49 having been relieved of the tension imposed on it, moves toward contact plate 55, and simultaneously the spring 54 is flexed causing contact member 52 to be moved toward contact plate 47 and contact thereof engaged, this results in breaking the circuit to the yellow signal and establishes the circuit to the green signal. Contact plate 36 in the solenoid circuit is disposed in the path of travel of the lever arm 26 but is so located that the contact 39 of the lever arm 26 does not engage the contact 38 of the contact plate 36 to complete the circuit to the solenoid 96 until there has been a downward movement of the accelerator pedal 18 sufficient to cause the lever arm to travel from its position of rest on the bracket 20 to engage the contact plate 36 where it is held against further travel. The distance of travel of the lever arm is adequate for a vehicle to attain sufficient speed to negotiate and complete the directional turn before the circuit will be broken to the directional signal being employed.

When the lever arm 26 engages the contact plate 36 and is held against further travel therebeyond, the linkage 23 and 24, and arm 22 will continue to move under the influence of the pedal in its downward movement. This is permitted because the lever arm 26 is loosely mounted on the shaft 21, and the lever arm 26 has only a frictional engagement with the arm 22, by means of the disk 31, spring 32 and nut 30, so that when the lever arm 26 is held against further travel by the contact plate 36, the stud 28 of arm 22 will continue to travel through the slot 27 of the lever arm.

What is claimed is:

1. A signal device for motor vehicles comprising a yellow signal light and a green signal light, and right and left directional signal lights, a switch having circuits leading thereto from said yellow and green signal lights, an accelerator pedal, a lever arm connected to said pedal for pivotal movement on downward movement of said pedal, means interposed between said lever arm and said switch, said lever arm engaging said interposed means when said pedal is at rest to cause said switch to close the circuit to said yellow signal, said pedal upon being depressed moving said lever arm from engagement with said interposed means to break the circuit to said yellow signal, means for simultaneously urging said switch into position for completing the circuit to said green signal, a manually operated selector switch having circuits leading to said directional signals, said selector switch being operable to establish a circuit to either directional signal, a solenoid having a core for engaging said selector switch when moved to establish a circuit to either directional signal for retaining said selector switch after closing the circuit, said lever arm during its movement imparted thereto by said pedal completing a circuit to energize said solenoid and cause said solenoid to release said selector switch and allow said selector switch to return to neutral position.

2. A signal device for motor vehicles comprising yellow, green and red signal lights, a switch box having circuits leading thereto from said signal lights, a switch for said circuits, an accelerator pedal, a lever arm pivotally mounted on said switch box and connected to said pedal, means interposed between said lever arm and said switch, said lever arm engaging said interposed means and actuating said switch to close the circuit to said yellow signal when said accelerator is at rest, means in said switch box for urging said switch into position for completing the circuit to said green light simultaneous with the breaking of the circuit to said yellow light upon the actuation of said accelerator pedal and the moving of said lever out of engagement with said interposed means, a brake pedal, a source of electrical current, an electric connection between said source and said switch operated by said brake pedal, means mounted in said switch box and in said circuit for said red signal light, said brake pedal upon being depressed, subsequent to the release of the accelerator pedal, establishing a circuit to said means for actuating said switch to complete the circuit to said red light contemporaneous with the breaking of the circuit to said yellow light and said brake pedal upon being released breaking the circuit to said means and establishing the circuit to said yellow light.

RAYMOND A. RODRICK.

REFERENCES CITED

The following references are of record in the file of this patent:

UNITED STATES PATENTS

| Number | Name | Date |
|---|---|---|
| 1,705,135 | Phillips | Mar. 12, 1929 |
| 2,064,735 | Curtiss | Dec. 15, 1936 |
| 2,092,333 | Reed | Sept. 7, 1937 |
| 2,096,069 | Seiden | Oct. 19, 1937 |
| 2,126,940 | Metcalf | Aug. 16, 1938 |
| 2,128,769 | Finnell | Aug. 30, 1938 |
| 2,260,080 | Nelsen | Oct. 28, 1941 |